(12) United States Patent
Estlick et al.

(10) Patent No.: US 12,223,324 B2
(45) Date of Patent: Feb. 11, 2025

(54) METHODS AND APPARATUS FOR PROVIDING MASK REGISTER OPTIMIZATION FOR VECTOR OPERATIONS

(71) Applicant: ADVANCED MICRO DEVICES, INC., Santa Clara, CA (US)

(72) Inventors: Michael Estlick, Fort Collins, CO (US); Eric Dixon, Fort Collins, CO (US); Theodore Carlson, Fort Collins, CO (US); Erik D. Swanson, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 1 day.

(21) Appl. No.: 17/957,604

(22) Filed: Sep. 30, 2022

(65) Prior Publication Data
US 2024/0111526 A1    Apr. 4, 2024

(51) Int. Cl.
G06F 9/38    (2018.01)
G06F 9/30    (2018.01)

(52) U.S. Cl.
CPC .......... G06F 9/3836 (2013.01); G06F 9/3824 (2013.01); *G06F 9/30036* (2013.01)

(58) Field of Classification Search
None
See application file for complete search history.

(56) References Cited

U.S. PATENT DOCUMENTS

| | | | | |
|---|---|---|---|---|
| 2007/0118720 A1* | 5/2007 | Espasa | ............... | G06F 9/3836 712/E9.019 |
| 2008/0082788 A1* | 4/2008 | Veidenbaum | ......... | G06F 9/3836 712/23 |
| 2008/0155210 A1* | 6/2008 | Taunton | ............... | G06F 9/30043 711/E12.015 |
| 2009/0198966 A1* | 8/2009 | Gschwind | ........... | G06F 9/30112 712/E9.016 |
| 2012/0216011 A1* | 8/2012 | Gove | ................... | G06F 15/8053 712/7 |
| 2017/0083339 A1* | 3/2017 | Burger | ................ | G06F 9/30007 |
| 2021/0157592 A1* | 5/2021 | Horley | ................ | G06F 9/30189 |

OTHER PUBLICATIONS

Rezaur Rahman, "Xeon Phi Vector Architecture and Instruction Set", Sep. 5, pp. 31-47 (Year: 2013).*

* cited by examiner

*Primary Examiner* — Courtney P Spann

(57) ABSTRACT

A data processing system includes a vector data processing unit that includes a shared scheduler queue configured to store in a same queue, at least one entry that includes at least a mask type instruction and another entry that includes at least a vector type instruction. Shared pipeline control logic controls a vector data path or a mask data path, based a type of instruction picked from the same queue. In some examples, at least one mask type instruction and the at least one vector type instruction each include a source operand having a corresponding shared source register bit field that indexes into both a mask register file and a vector register file. The shared pipeline control logic uses a mask register file or a vector register file depending on whether bits of the shared source register bit field identify a mask source register or a vector source register.

20 Claims, 7 Drawing Sheets

METHODS AND APPARATUS FOR PROVIDING MASK REGISTER OPTIMIZATION FOR VECTOR OPERATIONS

BACKGROUND OF THE DISCLOSURE

Integrated circuits such as system on chips (SoC's), employ multiple processing cores such as central processing unit (CPU) cores, graphic processing units (GPU) cores, vector processing units (VPUs), such as floating point units (FPUs) and other processing units that execute instructions. In some implementations, CPU and/or GPU cores dispatch instructions to one or more vector processing units to carry out vector processing operations on data. Vector processing units, as known in the art may employ datapaths that employ single instruction multiple data units (SIMD) or other structures, configured in lanes, to process vector data. Such operations are increasingly useful in data centers for machine learning operations, artificial intelligence operations, cloud based gaming application and for other applications.

Vector processing units, are known to use masked vector instructions to allow use of a mask register(s) to mask certain vector processing lanes during an operation so that certain vector processing lanes are not enabled for one or more vector operations. For example, a vector register stores data for multiple lanes of a data type—such as a 512 bit register forming 8 lanes (each lane having one or more FPUs) of 64 bit floating point numbers. A mask register is 8 bits wide (e.g., one bit for each of 8 lanes) and is used to conditionally do operations lane by lane—each bit tells the floating point unit whether to do certain operations in a lane or not. For example, if a lane has a mask bit set, a certain conditional operation can be performed using different lanes. (e.g., add two vector registers together or leave a result unmodified). Without a mask register a vector operation would do a same operation on every lane, so mask registers allow conditional operations to be carried out by selecting which lanes are used.

However, known systems use extra pipeline control hardware and other separate hardware to support the mask operations. This adds cost, complexity and latency to vector operations. For example, known systems use a separate mask instruction scheduler queue to process only mask instructions (used for masked vector operations or for mask to mask instructions such as read a mask value, modify to a different value and write to the same mask register). In addition, a separate vector instruction scheduler queue is used for only vector instructions. Also, separate broadcast result buses are used for each of the mask queue and the vector queue. Separate mask pipeline control logic and separate vector pipeline control logic are also used so that there is a separate processing path for each mask instruction and a separate processing path for each vector instruction from each scheduling queue.

In addition, a vector broadcast bus is used when a vector result is complete for a given vector register and a separate mask broadcast bus is used to broadcast that a mask result is complete for a given mask register. Each scheduler for a respective queue has to process the broadcast from their respective buses. Source register address spaces are also separate to facilitate the independent processing. For example, a mask source register address associated with a mask instruction may be a separate 8 bit data structure that is processed by the mask pipeline control logic and a vector source address for a vector instruction is a separate 512 bit data structure that is processed by the separate vector pipeline control logic. Accordingly, an improved vector processing structure and operation is desired.

BRIEF DESCRIPTION OF THE DRAWINGS

The implementations will be more readily understood in view of the following description when accompanied by the below figures, wherein like reference numerals represent like elements, and wherein.

Figure 1:
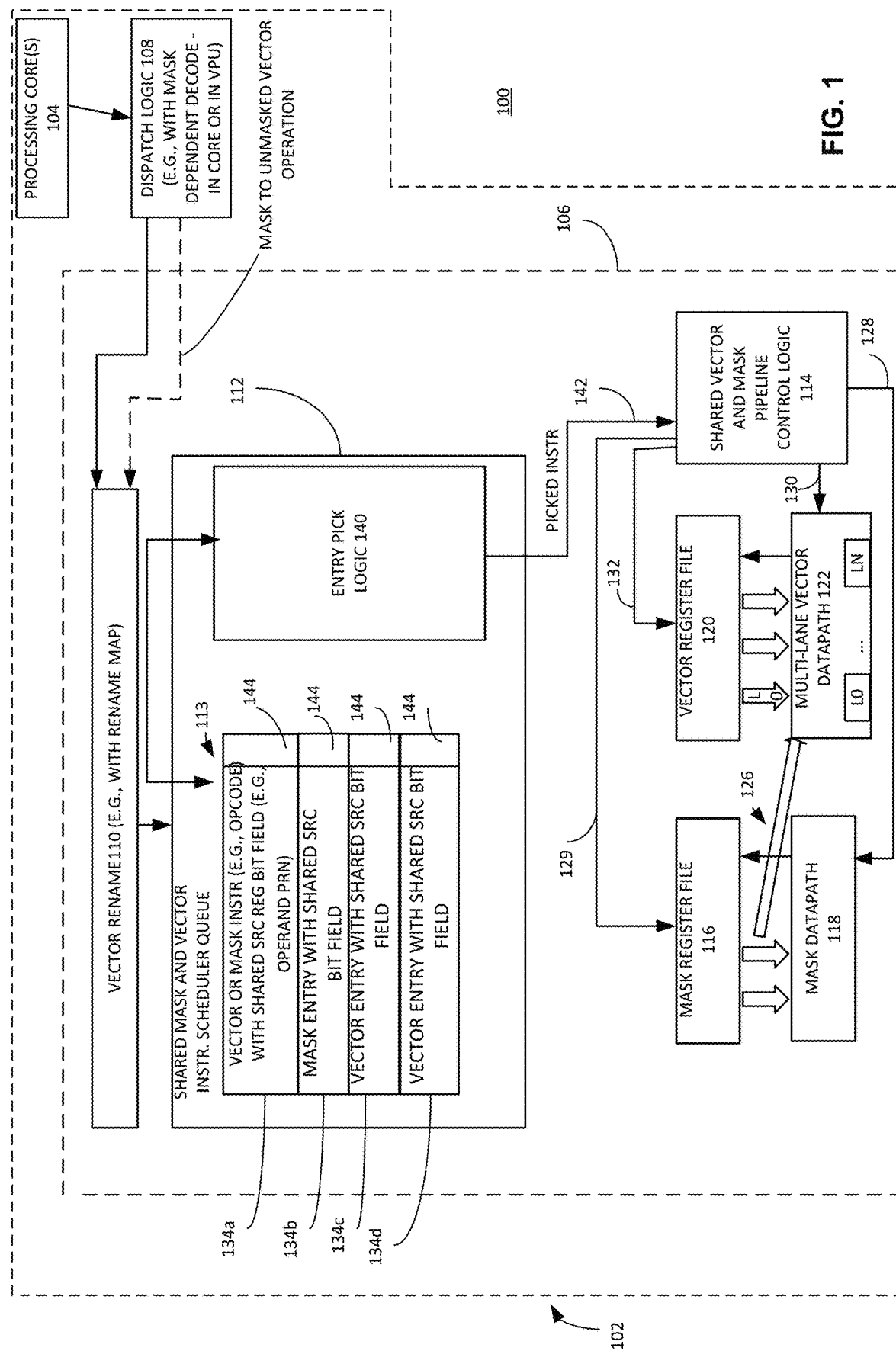
FIG. 1 illustrates a block diagram of an integrated circuit that employs a vector processing unit with a shared scheduler queue in accordance with one example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

The inventors have found that the use of separate scheduler queues, pipeline controls, broadcast buses, and separate hardware to support the mask operations can be costly in terms of increasing die size of the integrated circuit, and/or adding power consumption, and/or adding design complexity and/or adding latency to vector operations. Accordingly, in some implementations disclosed herein, an integrated circuit includes a vector data processing unit that includes a shared scheduler queue configured to store in a same queue, at least one entry that includes at least a mask type instruction and another entry that includes at least a vector type instruction. Shared pipeline control logic is shared to control either of both a vector data path or a mask data path, based a type of instruction picked from the same queue. Using a scheduler queue that has entries for both vector type instructions and mask type instructions avoids, among other things, the need for a separate vector scheduling queue and separate mask scheduling queue. Having pipeline control logic that controls both the vector data paths and mask data paths also reduces cost and complexity compared to systems that employ separate pipeline control logic for mask operations and vector operations from each separate scheduling queue.

In some implementations, the at least one mask type instruction and the at least one vector type instruction each include a source operand having a corresponding shared source register bit field that indexes into both a mask register file and a vector register file. The shared source register bit field is shared in that a same bit field, is used to index to either or both of the mask register file or the vector register file. In certain implementations the shared pipeline control logic uses a mask register file or a vector register file depending on whether bits of the shared source register bit field identify a mask source register or a vector source register. As such, in some implementations a VPU encodes both source mask registers and source vector registers in a same bit field that identifies either source mask registers or source vector registers for instructions in the same queue.

In certain implementations, the vector processing unit uses a value range of the shared bit field to determine whether bits of the shared source register bit field identify a mask source register or a vector source register. In some implementations a set of least significant bits and/or most significant bits of the bit field are used to identity whether bits of the shared source register bit field identify a mask source register or a vector source register.

In some implementations, the shared pipeline control logic includes a decoder that decodes the shared source register bit field associated with an entry opcode of a picked instruction and enables use of a mask register file or vector register file per source and decodes the entry opcode to determine whether to control a mask data path or vector data path for a given source in an entry.

In certain implementations, the shared source register bit field in an N-bit bit field, where N is an integer, representing a physical register number (PRN) and includes data identifying either a mask source register or data representing a vector source register space. In some implementations the shared pipeline control logic decodes the PRN and enables use of either a mask register file or a vector register file based on the decoded PRN.

In certain implementations, the shared scheduler queue includes a common result broadcast bus that broadcasts a shared result register bit field that identifies a result register corresponding to either a vector source register or a mask source register depending on bit configuration settings of the shared result register bit field.

In some implementations, the shared scheduler queue includes in a same entry, at least a vector source register bit field and at least a mask source register bit field, and the vector processing unit includes broadcast result compare logic that determines when results are available for a mask source register or a vector source register in the entry based on the shared result register bit field from the common result broadcast bus.

In certain implementations, the vector processing unit includes dispatch logic that avoids using a scheduler entry in the shared scheduler queue by changing at least one of: an incoming masked vector move operation and a masked vector load operation, to an unmasked vector operation based on the shared source register bit field indicating that all vector processing lanes in a vector data path are to be used for the masked vector move operation or the masked vector load operation.

In some implementations, the shared pipeline control logic performs a mask register file read before performing a vector register read, in response to detecting that the type of instruction includes operands for both a mask source register and a vector source register.

In certain implementations, an apparatus includes at least one processing core; a vector data processing unit, operatively coupled to the at least one processing core, and the vector processing unit includes a shared scheduler queue that stores at least both a mask type instruction and a vector type instruction in an entry thereof. The at least one mask type instruction and the at least one vector type instruction each include at least one source operand having a corresponding shared source register bit field that indexes into both a mask register file and a vector register file. The vector processing unit includes a vector data path configured to process vector data based on a queued vector type instruction and includes a mask data path configured to process a queued mask instruction that controls at least which of a plurality of vector processing pipelines in the vector data path are enabled to process vector data for a queued vector instruction. The vector processing unit includes shared pipeline control logic, operatively coupled to both the vector data path and the mask data path, operative to control either of the vector data path or the mask data path based a type of instruction picked from the same queue, and operative to use a mask register file or a vector register file depending on whether bits of the shared source register bit field identify either a mask source register or a vector source register.

In some implementations, the vector processing unit uses a value range of the shared bit field to determine whether bits of the shared source register bit field identify a mask source register or a vector source register. In certain implementations, the shared pipeline control logic includes a decoder that decodes the shared source register bit field associated with an entry opcode of a picked instruction and enables use of a mask register file or vector register file per source and decodes the entry opcode to determine whether to control a mask data path or vector data path for a given source in an entry.

In certain implementations, the shared source register bit field includes N-bits, where N is an integer, representing a physical register number (PRN) identifies either a mask source register or data representing a vector source register. The shared pipeline control logic decodes the PRN and enables use of either a mask register file or a vector register file based on the decoded PRN.

In some implementations, the shared scheduler queue includes a common result broadcast bus that broadcasts a shared bit field that identifies a result register corresponding to either a vector source register or a mask source register depending on bit configuration settings of the shared result register bit field.

In certain implementations, the shared scheduler queue includes in a same entry, at least a vector source register bit field and at least a mask source register bit field, and the vector processing unit includes broadcast result compare logic that determines when results are available for a mask source register or a vector source register in the entry based on the shared result register bit field from the common result broadcast bus.

In certain implementations the shared pipeline control logic performs a mask register file read before performing a vector register read, in response to detecting that the type of instruction includes operands for both a mask source register and a vector source register.

In some implementations, a method carried out by a vector processor unit includes storing in a same queue, at least one entry that includes at least a mask type instruction and another entry that includes at least a vector type instruction; and controlling either of at least one vector data path or at least one mask data path based a type of instruction picked from the same queue.

In certain implementations the method includes executing a picked instruction from the shared scheduler queue using a mask register file or a vector register file depending on whether bits of a shared source register bit field associated with the picked instruction identifies either a mask source register or a vector source register.

In some implementations, the method includes using a value range of the shared bit field to determine whether bits of the shared source register bit field identify a mask source register or a vector source register. In certain implementations, the shared source register bit field includes N-bits, where N is an integer, representing a physical register number (PRN) that identifies either a mask source register or data representing a vector source register and the method further includes decoding the PRN and enabling use of either a mask register file or a vector register file based on the decoded PRN.

FIG. 1 is a block diagram illustrating one embodiment of a data processing apparatus 100, such as a system on chip, data center server, laptop, mobile phone, internet appliance, or other suitable device that employs an integrated circuit 102 that in some implementations employs one or more processing cores 104. The one or more processing cores 104 are configured to execute instructions stored in memory and in some examples, include CPU cores, GPU cores or other processing units. The integrated circuit 102 includes one or more vector processing units 106 such as floating point units (FPUs), or other suitable vector processing units that execute instructions and use register files. In some implementations, the one or more processing cores dispatches instructions to the VPU 106 via dispatch logic 108 which are then converted to opcodes and operands understood by the VPU.

In this example, the VPU 106 includes a vector rename block 110, a shared mask and vector scheduler queue 112, shared pipeline control logic 114, a mask register file 116, a mask data path 118, a vector register file 120 and a multi-lane vector data path 122. The mask register file 116, the mask data path 118, the vector register file 120 and the multi-lane vector data path 122 are known components in vector processors but are configured to be controlled instead by the shared pipeline control logic 114.

The mask data path 118 receives opcodes 128 for mask operations and the mask register file receives mask source register identifiers 129 and performs the requisite operation such as moving mask data for an identified mask source register in the mask register file 116, store new masks in the mask register file, change mask data in the mask register file 116 or perform other mask related operations as instructed. In some implementations, the mask data path 118 processes a queued mask instruction that controls which of a plurality of vector processing pipelines in the vector data path are enabled to process vector data for a queued vector instruction. As shown by arrow 126, the mask bits from a mask register are provided to the multi-lane vector data path 122 to mask out certain vector lanes within vector pipelines of the vector data path. The multi-lane vector data path 122 receives opcodes 130 and performs the requisite operation as defined by the opcode. Similarly, the vector data path 122 receives opcodes 130 for vector operations and the vector register file 120 receives vector source register identifiers 132 and performs the requisite masked vector operations and vector operations as instructed. Vector data is processed in a plurality of vector lanes and each vector lane produces source lane values that are stored in registers in the vector register file and retrieved and manipulated by the VPU as instructed.

Unlike known VPU's, the shared scheduler queue 112 is shared to store both mask type instructions and vector type instruction in a same queue 113. Mask type instructions are instructions that operate on source mask register information in the mask register file, use the mask data path 118 or are used to mask vector lanes; and vector type instructions are instructions that cause use of the vector register file 120 and employ the vector data path 122. The shared scheduler queue 112 has a plurality of entries, such as 32 entries in this example (or any other suitable number), wherein each entry can store either a mask type instruction or a vector type instruction shown as entries 134a-134n. The instructions are opcodes and have one or more corresponding operands such as source registers on which operations are performed. The shared pipeline control logic 114 controls either of the vector data path 122 via opcodes 130, or the mask data path 118 via opcodes 128, based a type of instruction (i.e., mask type or vector type) picked from the shared scheduler queue 112.

The shared scheduler queue 112 includes entry pick logic 140 that picks an entry from the queue and provides the corresponding picked instruction(s) 142 to the shared pipeline control logic 114 for decoding. Unlike known VPUs, the shared pipeline control logic 114 decodes the picked instruction from the shared scheduler queue to determine whether the instruction is a mask type instruction or a vector type instruction.

Figure 2:
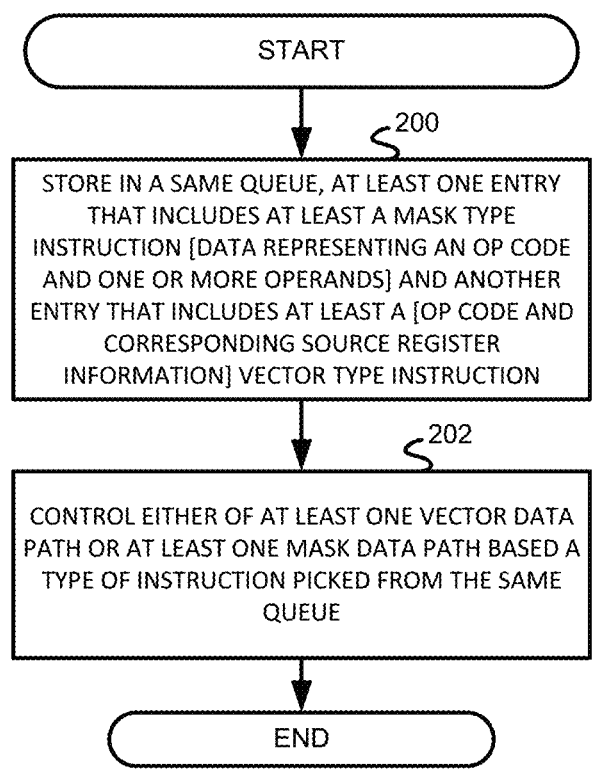
FIG. 2 is a flowchart illustrating a method for providing vector processing unit mask operations in accordance with one example set forth in the disclosure.

Referring also to FIG. 2, a method for providing vector processing unit mask operations is illustrated, and in some implementations, is carried out by the shared scheduler queue 112 and the shared pipeline control logic 114, however any suitable component may perform the operations. It will be recognized that the order of operations can be changed as desired for this operation and other set forth herein. As shown in block 200 the method includes storing in a same queue, at least one entry that includes at least a mask type instruction and another entry that includes at least a vector type instruction. This is done in some implementations by the shared scheduler queue 112 as instructions are dispatched by the dispatch logic 108. The dispatch logic 108 creates the mask and vector instructions to have the shared source register bit field 144 (see FIG. 1). As shown in block 202, the method includes controlling either the vector data path 122 or the mask data path 118 based a type of instruction picked from the shared scheduler queue 112. In some implementations this is done by the shared pipeline control logic 114.

Figure 3:
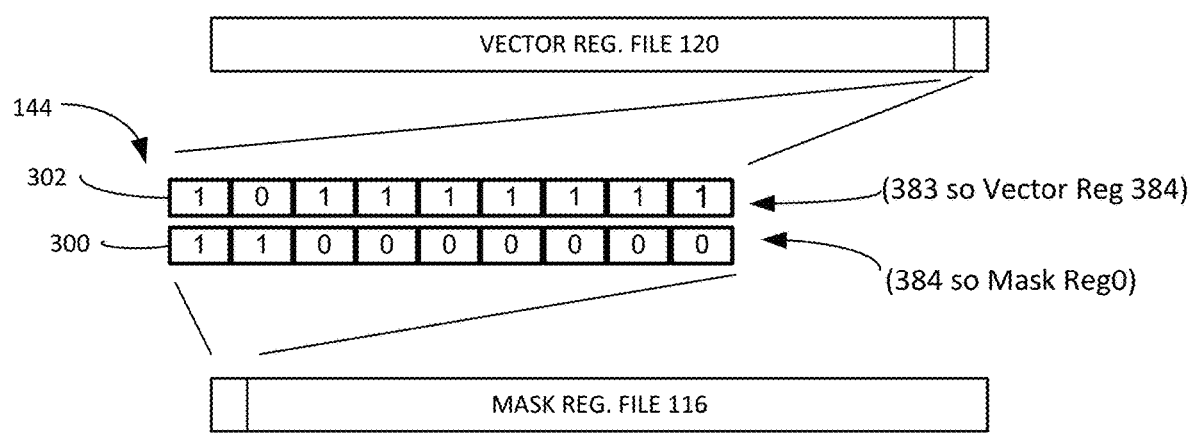
FIG. 3 is a diagram illustrating shared source register bit fields in accordance with one example set forth in the disclosure.

Referring also to FIG. 3 in some implementations, the mask type instructions and the vector type instructions in the queue 113 have a source operand having a corresponding shared source register bit field 144 that indexes into both a mask register file and a vector register file. The shared pipeline control logic 114 uses the mask register file 116 or the vector register file 120 depending on whether bits of the shared source register bit field 144 identify a mask source register in the mask register file or a vector source register in the vector register file. As such, unlike known VPUs, the shared pipeline control logic 114 decodes a shared source bit field 144 from picked instructions from the shared scheduler queue 112 to identify the mask source register identifiers 129 and/or the vector source register identifiers 132.

Each of the queued mask type instructions and the vector type instructions include at least one source operand having a corresponding shared source register bit field 144, such as a 9 bit field or other suitable sized bit field, that indexes into both the mask register file 116 and the vector register file 120. Stated another way, the source register space for the source mask registers and source register space for the source vector are shared. In some implementations the shared pipeline control logic 114 uses a value range of the shared bit field 144 to determine whether bits of the shared source register bit field identify a mask source register or a vector source register. The shared source register bit field is shared in that one bit field is used to index to either of both the mask register file or the vector register file. In some implementations, instead of ranges of values of the entire 9 bits, a set of least significant bits and/or most significant bits of the bit field are used to identity whether bits of the shared source register bit field identify a mask source register or a vector source register.

Examples of a 9 bit shared source register bit field 144 is shown as shared source register bit field 300, that is an operand for a mask type instruction, which indexes (directly or indirectly) to a source register in the mask register file 116. Shared source register bit field 302, that is an operand for a vector type instruction, which indexes (directly or indirectly) to a vector source register in the vector register file 120. In this example, the shared source register bit field 144 includes N-bits, where N is an integer, representing a physical register number (PRN) that directly identifies either a mask source register or data representing a vector source register. The shared pipeline control logic 114 decodes the PRN and enables use of either the mask register file 116 or the vector register file 120 based on the decoded PRN. In other implementations, an indirect indexing operation is employed such as indexing to an architectural register number (ARN) of a source, where the ARN is renamed to a PRN by a register renaming scheme.

As shown, the shared source register bit field 144 is a 9 bit encoded physical register number. In this example, there are 512 values (0-511). A range of values is used to designate PRN for source vector registers and for source mask registers. For source vector registers, for a vector type instruction, values 0-383 refer to 384 vector registers, whereas a different range of the 512 values, such as 384-447 are 64 mask registers and values 448-511 are invalid. Shared source register bit field 302 in this example has a value of 383 so the bit field is decoded as a source vector register in vector register file 120 whereas shared source register bit field 300 in this example has a value of 384 so the bit field is decoded as a source mask register in mask register file 116. It will be recognized that any suitable bit length for the shared source register bit field can be used.

Figure 4:
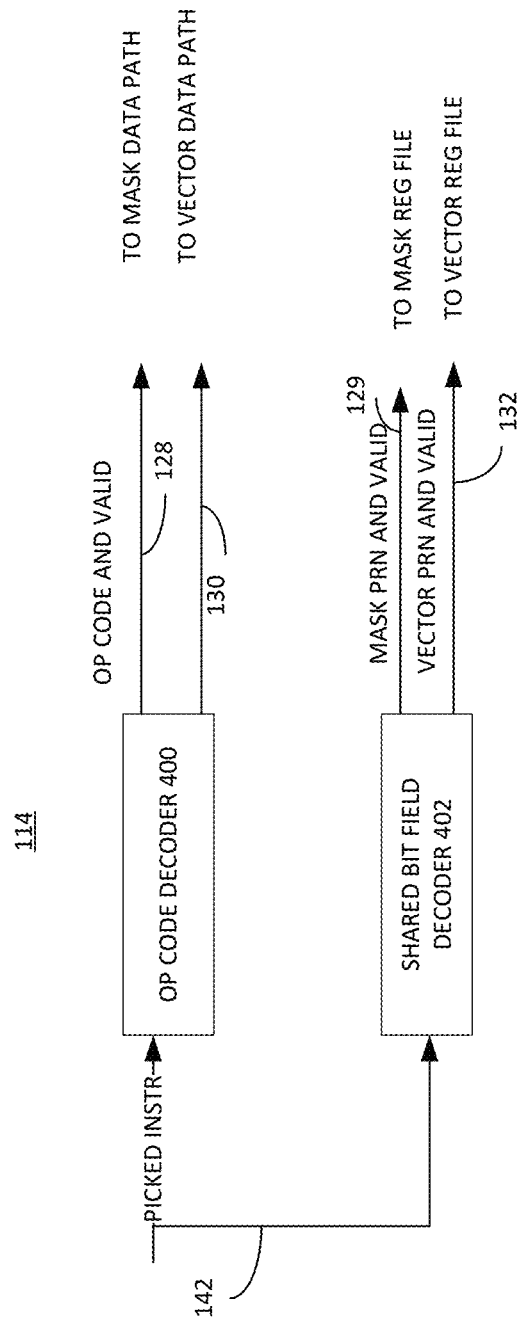
FIG. 4 is a block diagram illustrating shared pipeline control logic for both a vector data path and a mask data path in accordance with one example set forth in the disclosure.

FIG. 4 is a block diagram illustrating an implementation of the shared pipeline control logic 114. In some implementations, the shared pipeline control logic 114 is one or more state machines configured to carry out the operations as described herein. However, any suitable structure may be employed including field programmable gate arrays or other logic. The shared pipeline control logic 114 includes an opcode decoder 400 and a shared bit field decoder 402. In some implementations, the decoders compare inputs against valid encodings and set their outputs if a match is detected. The opcode decoder 400 decodes the picked instruction 142 to determine whether to control a mask data path or vector data path for a given source in an entry. The shared bit field decoder 402 also decodes the shared source register bit field 144 associated with an entry opcode of a picked instruction 142 to enable use of the mask register file 116 or vector register file 120 per each source associated with an instruction. The shared pipeline control logic 114 controls either of the vector data path 122 or the mask data path 118 based a type of instruction picked from the same queue, and uses a mask register file or a vector register file (depending on whether bits of the shared source register bit field 144 identify either a mask source register or a vector source register).

Figure 5:
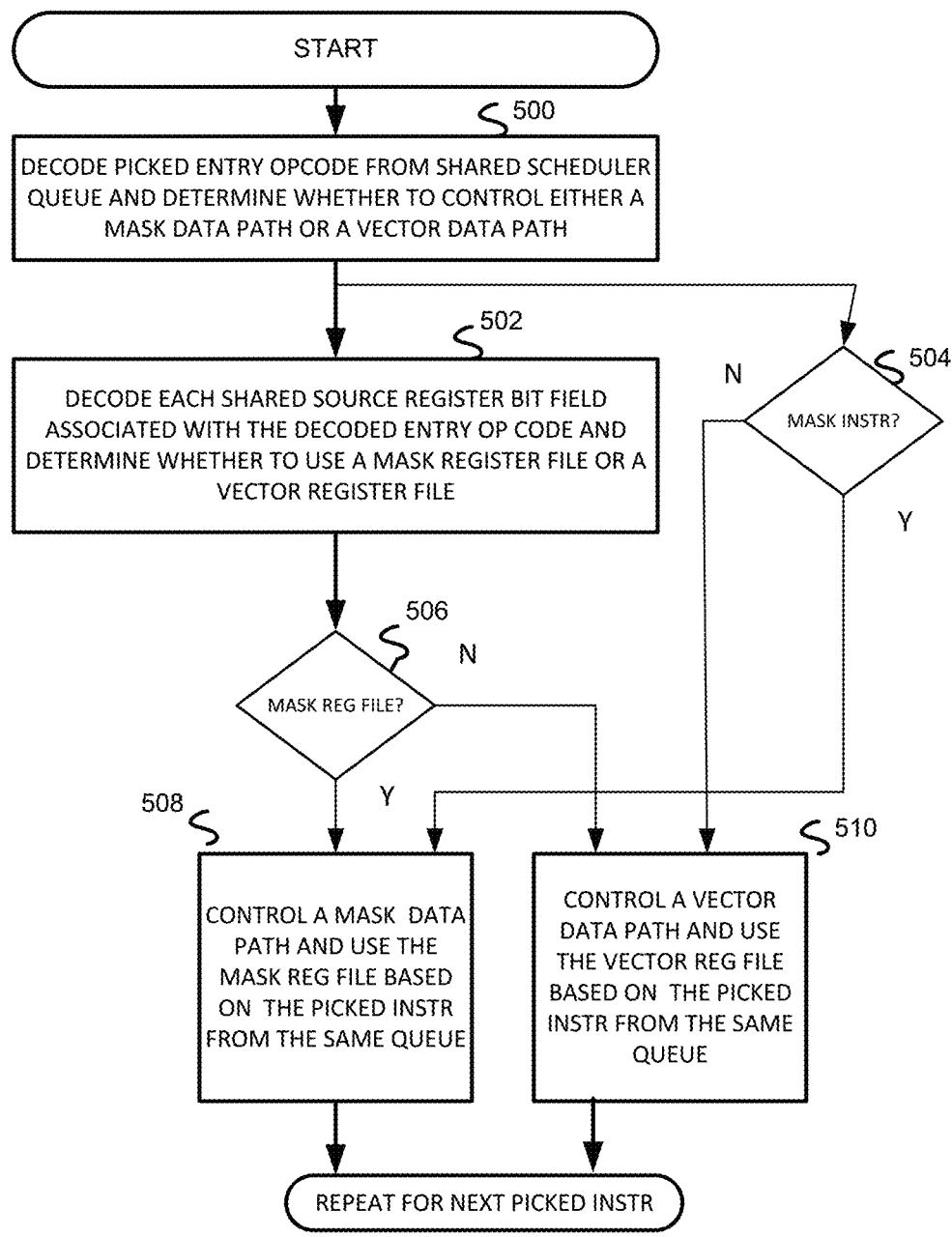
FIG. 5 is a flowchart illustrating a method for providing vector processing unit mask operations in accordance with one example set forth in the disclosure.
Figure 6:
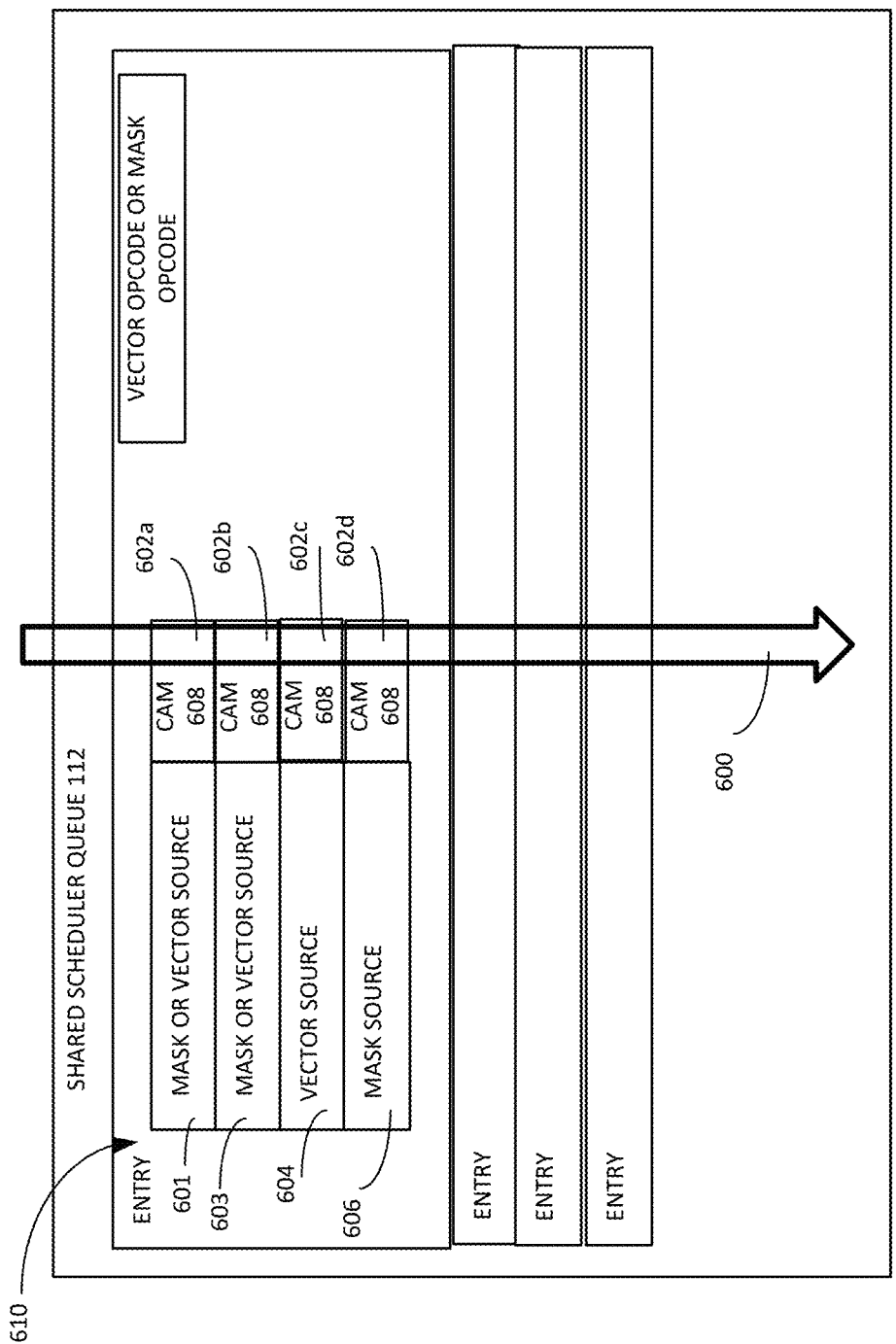
FIG. 6 is a block diagram illustrating a shared scheduler queue in accordance with one example set forth in the disclosure.

FIG. 5 is a flow chart illustrating an example of a method for providing vector processing unit mask operations, and in some implementations, is carried out by the shared scheduler queue 112 and the shared pipeline control logic 114, however any suitable component may perform the operations. It will be recognized that the order of operations can be changed as desired for this operation and other operations set forth herein. Referring also to FIG. 6, as shown in block 500, the shared pipeline control logic 114 decodes the picked entry opcode (instruction) 142 from the shared scheduler queue 112 and determines whether to control either a mask data path 118 or a vector data path 122 for the picked entry opcode (instruction) 142. This is done in some examples by the opcode decoder 400. For example, the opcode decoder 400 compares opcode inputs against valid opcode encodings, such as from one or more look up tables, for mask type instructions and vector type instructions and sets the output for each matched encoding. As shown in block 504 the opcode decoder 400 determines if the decoded opcode is for a mask operation or for a vector operation. As shown in block 502 the opcode decoder 400 also decodes each shared source register bit field 144 associated with the decoded entry opcode and determines whether to use a mask register file or a vector register file on a per source basis. For example, if the picked instruction 142 is of a type that has multiple sources as shown in FIG. 6 (e.g., a 4 source instruction), the shared source register bit field for each source of the instruction is decoded to determine for each source if the source register is a vector source register or mask source register and uses the decoded PRN of the register file for that source register access in the instruction. As shown in block 506 when a decoded shared source register bit field 144 identifies a source mask register 119, the mask register file 116 is used for the instruction. For example, the PRN is the read index for the register file and the valid data enables the read operation. As shown in block 508, the shared pipeline control logic 114 controls the mask data path 118 and use the mask register file 116. As shown in block 510, the shared pipeline control logic 114 controls the vector data path 122 and uses the vector register file 120 when the instruction is a vector instruction and a shared source register bit field 144 identifies a source vector register, such that the in some examples, the source register identifier 132 is the PRN of the source vector register. An instruction can use either or both of mask source registers and vector source registers, such as a masked vector operation. Therefore, the shared bit field decoder 402 includes multiple parallel decoder stages for each operand using an instruction. For example, when an instruction references four sources, the four shared source register bit fields will be decoded in parallel to see what PRN is reference for each source register. However, it will be recognized that any suitable decoding process may be employed.

As shown in FIG. 6, in some implementations, the shared scheduler queue 112 includes a common result broadcast bus 600 configured to broadcast a shared result bit field 602a-602d that identifies a result register that is ready for use corresponding to either a vector source register or a mask source register in the instruction queue depending on bit configuration settings of the shared result bit field. The shared result bit field that is broadcast uses the same format as the shared source register bit field 144. As also shown, an entry in the shared scheduling queue in some implementations includes a vector or mask type instruction that references multiple source registers of either or both vector and mask registers. In this example, source register subentries 610 within an entry are configured in different ways. For example, some subentries are configured to accommodate either mask or vector source registers, and others are fixed to store only vector sources and others are fixed to store only mask sources.

For example, as shown, the shared scheduler queue 112 includes in a same entry 134a, a source sub-entry that stores a vector source register bit field 604, a source sub-entry that is fixed to store either a mask source register bit field 606, and two source sub-entries 601 and 603 that are flexible to store a mask source register bit field or a vector source register bit field. Broadcast result compare logic 608 (which, in the exemplary embodiment is implemented as a content addressable memory or CAM) determines when results are available for a mask source register or a vector source register in the sub-entries based on the shared result register bit field from the common result broadcast bus 600. In some implementations the compare logic 608 compares the broadcast shared result register bit field 602a-602d with a corresponding shared source register bit field for a source entry and if they match, the same register in the register file is available to use. Stated another way, result PRNs are broadcast when they are ready to be consumed, sources are ready to be consumed when the broadcast PRN matches the source PRN. In some implementations, the shared result bit field 602a-602d is the same format as the shared source register bit field 144 and includes in one bit field, PRNs for both a source vector register and mask source register.

Referring back to FIG. 1, in some implementations, the dispatch logic 108 avoids using a scheduler entry in the shared scheduler queue 112 by changing at least one of: an incoming masked vector move operation or incoming masked vector load operation, to an unmasked vector operation when the shared source register bit field 144 indicates that all vector processing lanes in a vector data path are to be used for the masked vector move operation or the masked vector load operation. For example, if the shared source register bit field 144 is a mask source register PRN and all bits are set to "0", this indicates that no vector lanes are masked (all used). In some implementations, the dispatch logic changes the micro opcodes of the instruction to change the instruction to an unmasked vector operation. Unmasked vector moves are queued in the queue 113 but with no mask source. In certain implementations, the dispatch logic provide opcodes to the rename unit so that no register file entry is used and the scheduler is bypassed. For example, a register map is updated using move-elimination or load-elimination operations.

Figure 7:
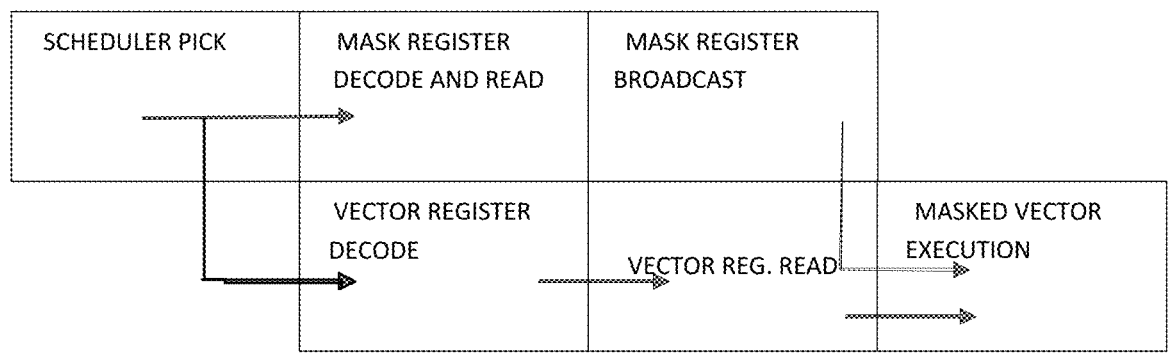
FIG. 7 is a diagram illustrating mask and vector source register read sequence flow in accordance with one example set forth in the disclosure.

Referring to FIG. 7 as shown, in some implementations, the shared pipeline control logic 114 performs a mask register file read before performing a vector register read, in response to detecting that the picked instruction 142 is a type of instruction that includes operands for both a mask source register and a vector source register.

Among other technical benefits, mask operation and vector operation hardware can be shared. Faster operation of mask operations in vector pipelines occurs. In some implementations, mask physical registers and vector physical registers are numbered within the same space. For example, 192 vector registers and 64 mask registers can be fit into an 8 bit space (0-191 are vector, 192-255 are the 64 masks). This allows, among other things, the scheduling hardware to be shared for vector and mask operands. Mask operations can share the same scheduler queue as vector operations, and sources in the scheduler can be either mask or vector source registers without extra hardware. In certain implementations, mask register loads can be handled as vector load and a move to a mask, avoiding extra hardware. In some implementations, mask register stores can be handled as a move to a vector and a vector store, similarly saving extra hardware. In some implementations, a mask register file read is moved before a vector register file read to hide latency of mask read and mask distribution. Any operation needed on the mask is done before distribution to reduce wires from mask to vector lanes. Mask to mask operations can be executed earlier in the pipeline and bypassed to vector operations without extra latency. Operations that have a mask source and a vector result (not masking the result, actually using the mask as an operand) can be lower latency.

Although features and elements are described above in particular combinations, each feature or element can be used alone without the other features and elements or in various combinations with or without other features and elements. The apparatus described herein in some implementations use software or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A data processing system comprising:
   a vector data processing unit comprising:

a shared scheduler queue configured to store in a same queue, at least one entry that includes at least one mask type instruction and another entry that includes at least one vector type instruction, wherein the at least one mask type instruction and the at least one vector type instruction each comprise a source operand having a corresponding shared source register bit field that provides access to a shared register space; and shared pipeline control circuitry operative to control either of a vector data path or a mask data path, based on a type of instruction picked from the shared scheduler queue.

2. The data processing system of claim 1 wherein the corresponding shared source register bit field indexes into a mask register file or a vector register file and wherein the shared pipeline control circuitry is operative to use a mask register file or a vector register file depending on whether bits of the shared source register bit field identify a mask source register or a vector source register.

3. The data processing system of claim 2 wherein the vector data processing unit uses a value range of the shared source register bit field to identify whether bits of the shared source register bit field identify a mask source register or a vector source register.

4. The data processing system of claim 2 wherein the shared pipeline control circuitry comprises a decoder operative to decode the shared source register bit field associated with an entry opcode of a picked instruction to enable use of a mask register file or vector register file per source and decode the entry opcode to determine whether to control a mask data path or vector data path for a given source in an entry.

5. The data processing system of claim 2 wherein the shared source register bit field comprises N-bits, where N is an integer, representing a physical register number (PRN) that identifies either a mask source register or data representing a vector source register and wherein the shared pipeline control circuitry is operative to decode the PRN and enable use of either a mask register file or a vector register file based on the decoded PRN.

6. The data processing system of claim 1 wherein the shared scheduler queue comprises a common result broadcast bus configured to broadcast a shared result register bit field that identifies a result register corresponding to either a vector source register or a mask source register depending on bit configuration settings of the shared result register bit field.

7. The data processing system of claim 6 wherein the shared scheduler queue comprises in a same entry, at least a vector source register bit field and at least a mask source register bit field, and wherein the vector data processing unit comprises broadcast result compare logic operative to determine when results are available for a mask source register or a vector source register in the same entry based on the shared result register bit field from the common result broadcast bus.

8. The data processing system of claim 1 wherein the vector data processing unit is operative to change at least one of: an incoming masked vector move operation and an incoming masked vector load operation, to an unmasked vector operation based on a shared source register bit field indicating that all vector processing lanes in a vector data path are to be used for the masked vector move operation or the masked vector load operation.

9. The data processing system of claim 1 wherein the shared pipeline control circuitry is operative to perform a mask register file read before performing a vector register file read, in response to detecting that the type of instruction includes operands for both a mask source register and a vector source register.

10. An apparatus comprising:
at least one processing core; and
a vector data processing unit, operatively coupled to the at least one processing core, comprising:
a shared scheduler queue configured to store at least both a mask type instruction and a vector type instruction in an entry thereof, wherein the mask type instruction and the vector type instruction each comprise a source operand having a corresponding shared source register bit field that indexes into a shared register space including both a mask register file and a vector register file;
a vector data path configured to process vector data based on a queued vector type instruction;
a mask data path configured to process a queued mask instruction that is used to control at least which of a plurality of vector processing pipelines in the vector data path are enabled to process vector data for a queued vector instruction; and
shared pipeline control circuitry, operatively coupled to both the vector data path and the mask data path, operative to control either of the vector data path or the mask data path based on a type of instruction picked from the queue, and operative to use a mask register file or a vector register file depending on whether bits of the shared source register bit field identify either a mask source register or a vector source register.

11. The apparatus of claim 10 wherein the vector data processing unit is operative to identify the mask source register or the vector source register based on a value range of the shared source register bit field.

12. The apparatus of claim 10 wherein the shared pipeline control circuitry comprises a decoder operative to decode the shared source register bit field associated with an entry opcode of a picked instruction to enable use of a mask register file or vector register file per source and decode the entry opcode to control a mask data path or vector data path for a given source in an entry.

13. The apparatus of claim 10 wherein the shared source register bit field comprises N-bits, where N is an integer, representing a physical register number (PRN) that identifies either a mask source register or data representing a vector source register and wherein the shared pipeline control circuitry is operative to decode the PRN and enable use of either a mask register file or a vector register file based on the decoded PRN.

14. The apparatus of claim 10 wherein the shared scheduler queue comprises a common result broadcast bus configured to broadcast a shared result register bit field that identifies a result register corresponding to either a vector source register or a mask source register depending on bit configuration settings of the shared result register bit field.

15. The apparatus of claim 14 wherein the shared scheduler queue comprises in a same entry, at least a vector source register bit field and at least a mask source register bit field, and wherein the vector data processing unit comprises broadcast result compare logic operative to identify when results are available for a mask source register or a vector source register in the same entry based on the shared result register bit field from the common result broadcast bus.

16. The apparatus of claim 10 wherein the shared pipeline control circuitry is operative to perform a mask register file read before performing a vector register file read, in response to detecting that the type of instruction includes operands for both a mask source register and a vector source register.

17. A method carried out by a data processing system comprising:
   storing in a same queue, at least one entry that includes at least a mask type instruction and another entry that includes at least a vector type instruction, wherein the at least one mask type instruction and the at least one vector type instruction each comprise a source operand having a corresponding shared source register bit field that accesses a shared register space; and
   controlling either of at least one vector data path or at least one mask data path based on a type of instruction picked from the same queue.

18. The method of claim 17 further comprising executing a picked instruction from a shared scheduler queue using a mask register file or a vector register file depending on whether bits of the shared source register bit field associated with the picked instruction identifies either a mask source register or a vector source register.

19. The method of claim 18 further comprising using a value range of the shared source register bit field to identify whether bits of the shared source register bit field identify a mask source register or a vector source register.

20. The method of claim 18 wherein the shared source register bit field comprises N-bits, where N is an integer, representing a physical register number (PRN) that identifies either a mask source register or data representing a vector source register space and wherein the method further comprises decoding the PRN and enabling use of either a mask register file or a vector register file based on the decoded PRN.

* * * * *